(12) United States Patent
Trinh et al.

(10) Patent No.: US 7,025,457 B2
(45) Date of Patent: Apr. 11, 2006

(54) DIP COATING PROCESS FOR OPTICAL ELEMENTS

(75) Inventors: Tuyethoa T. Trinh, New Brighton, MN (US); Mohamed-Shahih Smihi, White Bear Lake, MN (US); Luben Koev, Elk River, MN (US); Richard E. Zielinski, Coon Rapids, MN (US)

(73) Assignee: Vision-Ease Lens, Ramsey, MN (US)

( * ) Notice: Subject to any disclaimer, the term of this patent is extended or adjusted under 35 U.S.C. 154(b) by 0 days.

(21) Appl. No.: 10/632,415

(22) Filed: Jul. 31, 2003

(65) Prior Publication Data
US 2004/0096577 A1 May 20, 2004

Related U.S. Application Data

(60) Provisional application No. 60/400,343, filed on Jul. 31, 2002.

(51) Int. Cl.
*G02C 7/02* (2006.01)

(52) U.S. Cl. .................. 351/177; 351/159; 351/163

(58) Field of Classification Search ........... 351/177–8, 351/44, 49, 159, 160 R, 163; 359/581; 623/6.62; 2/435; 427/157–8, 169, 160–2, 164–5
See application file for complete search history.

(56) References Cited

U.S. PATENT DOCUMENTS

| 4,291,097 A | * | 9/1981 | Kamada et al. | 428/412 |
| 5,895,609 A | * | 4/1999 | Doyle et al. | 264/1.7 |
| 6,355,104 B1 | * | 3/2002 | Polster | 118/666 |
| 2002/0159160 A1 | * | 10/2002 | Kayanoki | 359/642 |

* cited by examiner

*Primary Examiner*—Jordan M. Schwartz
*Assistant Examiner*—Jessica Stultz
(74) *Attorney, Agent, or Firm*—Inskeep IP Group, Inc.

(57) ABSTRACT

A dip coating process is disclosed that provides a coating on the surfaces of an optical element with more consistent coating thickness. The objectives of this invention are accomplished by holding the coated optical element so that a meniscus is created between the element and the surface of the coating solution. At such a position, the capillary force generated by the touching meniscus helps drain down excessive coating at the bottom of the substrate to quickly yield a consistent coating thickness over the coated surface.

18 Claims, 1 Drawing Sheet

DIP COATING PROCESS FOR OPTICAL ELEMENTS

RELATED APPLICATIONS

This application claims priority to prior U.S. provisional application Ser. No. 60/400,343 filed Jul. 31, 2002, the entire contents of which are incorporated herein by reference.

BACKGROUND OF THE INVENTION

The present invention relates to a process for applying and forming a coating on an optical element such as an ophthalmic lens or a goggle plate. More specifically, the present invention relates to a process that dip-coats an abrasion-resistant coating on the surfaces of an optical element with more thickness consistency. The present invention also relates to a process to dip-coat a tintable abrasion-resistant coating with more thickness consistency. The present invention further relates to a tinted optical element coated with a tintable coating which is applied with the inventive process.

Ophthalmic lenses made from non-glass materials, such as polycarbonate and CR-39®, become popular due to their low cost and light weight. Polycarbonate provides further advantages such as high refractive index and high impact resistance compared to CR-39®. However, they are more susceptible to surface scratch than mineral glass. Application of an abrasion resistant coating (or hard coating) on the surfaces, both front (convex) and back (concave), of a non-glass ophthalmic lens, is necessary.

Some lens prescriptions need sunscreen function for eye protection. A lens can be made into a sunscreen either during or after the manufacturing. Tinting is the most common way to convert a clear lens into a sunscreen at an optical or dispensary laboratory. It is accomplished by immersing the lens in an aqueous dye bath under a given temperature for a certain amount of time. CR-39.RTM. readily absorbs dye molecules. Thus, lenses made from CR-39.RTM. can be easily tinted to achieve different levels of color and darkness. A hard coating is then applied on the tinted lenses by spin- or dip-coating. On the other hand, polycarbonate doesn't absorb dye as easily. Lenses made from polycarbonate rely on a tintable hard coating, which readily absorbs dye molecules, for its tintability.

The thickness of a tintable hard coating is usually less than about 15 microns. Most tinting dyes can achieve this thickness under normal laboratory tinting conditions. In order to have even color and light transmission, it is desirable to have a coating layer with consistent thickness across the lens surface. The quicker the coating tints, the more important the coating's evenness is.

Lenses made from polycarbonate, either finished or semi-finished, are coated with a hard coating to protect their surfaces from damage. If the coating is tintable, the optical or dispensary laboratory does not need to strip off the hard coating and re-coat with a tintable one. Lenses are commonly dip-coated in the manufacturing site. With the dip coating process, there is a tendency that coating solution flows down due to gravity after the lenses are withdrawn from the coating bath, which makes the thickness gradually increase from the top to the bottom. This is known as a coating "wedge". This is especially noticeable in the case where the coating solution has very low viscosity (e.g. less than 10 cPs) and the coating process has high optical element withdrawal speed. The coating wedge is also adversely affected by high withdrawal speed of the coated articles from the coating bath.

Although dip coating has long been used as a common coating technique, and its applicability to optical elements such as ophthalmic lenses and goggles is well established, the thickness unevenness has been a reoccurring issue. Many methods aiming at the elimination of the thickness difference along the lens surface have been attempted, such as decreasing the withdrawal speed, flipping the articles 90° after dipping, dashing the articles on an absorbent material like a paper towel, shaking the lenses after dipping, and designing a mechanical blade to wipe off excessive coating solution.

Among the above approaches, it is possible that controlling the withdrawal speed could lead to a more improved uniform coating layer. That is, by decelerating the withdrawal speed during the withdrawal, it may be possible to achieve a more uniform coating layer. However, such an approach would lead to increased processing times for each lens. Moreover, the deceleration profile would need to be very accurately controlled and such control would require expensive control of the coating equipment, making it an impractical option.

Other approaches also require equipment investment to an existing dip-coating line. Despite these investments, results may still remain unsatisfactory.

OBJECTS AND SUMMARY OF THE INVENTION

Thus, it is the objective of the present invention to provide a dip-coating process that produces a consistent coating thickness along the lens surface, without expensive equipment investment.

The objectives of this invention are accomplished by modifying a standard dip-coating process to include the step of holding the coated optical element so that the bottom is within 2 mm of the surface of the coating solution. At such a position, the capillary force generated by the touching meniscus helps drain down excessive coating at the bottom of the substrate to quickly yield a consistent coating thickness over the coated surface.

According the invention, a process for applying an abrasion resistant dip coating onto the surfaces of an optical element may comprise the following steps:

Washing the optical element with a warm soap solution or an alkaline solution;

Drying the optical element with hot air;

Optionally removing traces of water with a water miscible solvent such as methanol;

Dipping the optical element into a coating solution and removing it at a predetermined dipping speed;

Holding the optical element for a predetermined time so that its bottom barely "touches" the solution surface, just above the coating solution;

Optionally drying the coating to a tack free state at an appropriate temperature for a predetermined time;

Curing the coating with appropriate conditions (e.g., at a predetermined temperature for a predetermined time if the coating is thermally curable).

With most coating solutions, the bottom of the optical element can be positioned approximately 2 mm above the coating solution. This step allows excessive coating to be wicked off the optical element.

Ideally, this process can be used to apply a uniform coating of 2 to 10 microns to an optical element such as an ophthalmic lens or a goggle plate. Preferably, the coating can either be thermally curable or UV curable. In addition to abrasion resistant (hard) coatings, the process can also be used to dip apply other types of coatings such as anti-fog and anti-reflection coatings onto optical elements.

DETAILED DESCRIPTION OF THE INVENTION

Figure 1A:
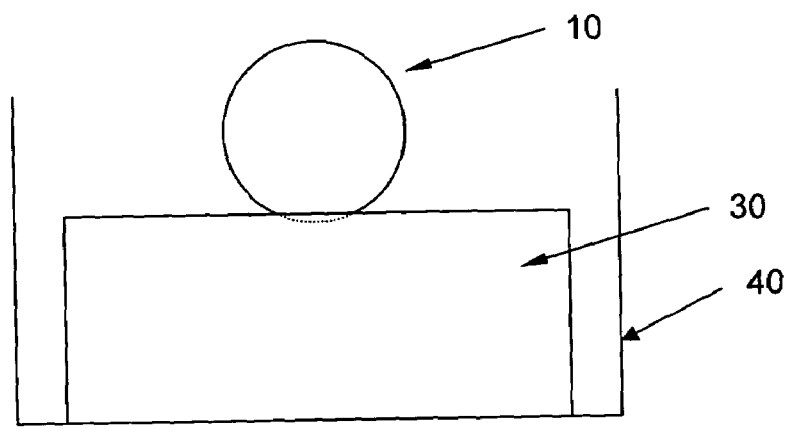
FIG. 1A is a side view of an optical element being removed from a dip-coating bath.

A preferred embodiment of the present invention may include the following components:

a bath of coating solution, filled to overflow and thereby allowing coating solution to fill to the top edge;

a fixture (carrying) system capable of holding optical elements such as ophthalmic lenses;

a mechanism capable of dipping the optical elements;

a control system to control the speed and position of the optical element during the dipping process. A servomotor and a Programmable Logic Controller system can be used for this purpose;

a drying area where the coating can be dried to a tack free state;

a final curing oven to cure the coating for thermally curable coating, or an UV curing mechanism for UV curable coating.

The hard coating applicable in the process of the present invention can be either a thermally or UV curable hard coating although a thermally curable coating is preferred. UV curable coatings are usually based on acrylate chemistry, and are either solventless or contain some solvents. Thermally curable coatings for ophthalmic lenses are mostly siloxane based, made from hydrolyzed tetraethoxy silane, and other functional silanes. Thermally curable coatings usually have higher abrasion resistance than UV curable coatings. However, Thermally curable siloxane coatings need longer curing time than UV curable coatings. Exemplary thermally curable coatings can be found in numerous patents, such as U.S. Pat. Nos. 4,211,823, 4,547,397, 5,357,024, 5,385,955, and 6,538,092. Exemplary UV curable coatings can be found in 4,384,026, 4,478,876, 4,491,508, 5,126,394, and 5,409,965. They are all incorporated herein by reference.

The inventive dip-coating process is especially useful to apply coatings having a viscosity less than 10 cPs, solid content of from about 10% to about 35% by weight, at a temperature from about 30° F. to about 90° F.

The coating bath tank may be fabricated from any suitable material and may have any suitable dimensions and shape. Preferred materials for the tank include stainless steel, plastic, copper, steel, and the like. The shape of the tank can be round, oval, or rectangular. The size of the bath tank is dependent upon the number of substrates to be coated. The depth of coating in the bath tank is at least 1.2 times, preferably in a range from 1.5 times to 3 times, the length of the optical elements to be coated.

A setup to allow coating overflow so that coating solution always fills up to the top of the bath edge is preferred. An example is disclosed in U.S. Pat. No. 4,353,934. It is incorporated herein by reference.

Other optional setups to the coating bath can be provided for special purposes. For example, the coating bath can be equipped with a jacket or coil circulation system to control the temperature of the coating.

Elements to be coated can either be single or grouped. It is preferred to coat a group of elements in one coating bath from the productivity point of view. For well designed coating bath and carrying system, the solution turbulence induced by multiple elements will not effect the coating quality, as described in U.S. Pat. No. 5,725,667, which is incorporated herein by reference. The spacing between optical elements can preferably be from about 10 mm to about 100 mm, and ideally from about 20 mm to about 50 mm.

The coating bath and optionally the fixture (carrying) system are placed in an enclosed chamber. The temperature and humidity of the chamber are controlled within the predetermined range for the best coating results. In one embodiment, the desired temperatures of the coating area ranges from 70° F. to 120° F., with relative humidity from 5% to 60%. It is desirable to keep the air flow in the chamber to a minimal level to prevent air current from causing ripples in the coating solution surface, which in turn causes coating non-uniformity.

The following three dipping mechanisms are applicable to the present invention: a) moving the optical elements to be coated in and out of the coating solution while fixing the coating bath, b) moving the coating bath up and down to dip the optical elements while keeping the optical elements on the fixture steady, c) filling and draining the coating solution in and out of the coating bath to coat the optical elements while keeping both the coating bath and the optical elements at rest.

The inventive process can be used to apply a uniform coating of 2 to 10 microns to an optical element such as an ophthalmic lens or a goggle plate, which is made of non-mineral glass material. Exemplary non-mineral glass materials include (meth)acrylic resins, styrene-acrylate copolymers, polycarbonate resins, diethyleneglycol bisallyl carbonate copolymers, (halogenated) bisphenol-A di(meth)acrylate homopolymers and copolymers, and (halogenated) bisphenol-A urethane-modified di(meth)acrylate homopolymers and copolymers, polyurethanes, polyester; cellulose acetate butyrate; and acrylonitrile-butadiene-styrene. Preferred materials for optical elements such as ophthalmic lenses are diethyleneglycol bisallyl carbonate copolymers such as CR-39® from PPG Industries, and polycarbonates such as Lexan® from GE Plastics, and Makrolon® from Bayer Polymers, and high refractive index resins such as MR-6, MR-7, and MR-8 plastics from Mitsui-Toatsu.

According to one embodiment of the present invention, the following steps make up the dip-coating process for an optical element:

Washing the optical element with a warm soap solution or an alkaline solution;

Drying the optical element with hot air;

Optionally removing traces of water with a water miscible solvent such as methanol;

Dipping the optical element into a coating solution, and removing it at a predetermined dipping speed;

Holding the optical element for a predetermined time so that it is barely "touches" the solution surface just above the coating solution;

Optionally drying the coating to a tack free state at an appropriate temperature for a predetermined time;

Completely curing the coating with appropriate conditions (e.g., at a predetermined temperature for a predetermined time if the coating is thermally curable).

In the initial washing step, the optical elements to be coated are washed with a warm soap solution or an alkaline solution to ensure thorough cleaning and adequate adhesion of the coating. Popular soap products available on the market are D Greeze GL55 (Solvent Kleene Inc.), Valtron 2201 (Valtech Corp, PA). Concentrations of soap solution can be from 3 to 14%, producing a pH range from 9 to 12. An alkaline solution can be either potassium hydroxide or sodium hydroxide, 0.5 M to 2 M. The solutions above are used with temperatures ranging from 80 to 130 F. Optical elements are washed in the soap or alkaline solution for 10 to 30 minutes, followed by several rinsing of the elements in de-ionized water.

The washing step may be accompanied by ultrasonic wave energy. The mechanical effect of ultrasonic energy can be helpful in both speeding dissolution of contaminants and displacing particles. The use of ultrasonic energy is beneficial in both cleaning and rinsing of optical elements. The frequency of the ultrasonic waves radiated to the coating solution can be 20 to 150 KHz or preferably 30 to 80 KHz, and the strength of the ultrasonic waves can be 0.2 to 5 w/cm$^2$.

After the optical elements to be coated are washed clean, they are dried with heated air. If necessary, a de-ionizing clean air spray can be supplied during the drying cycle. It is important that dust and other particles do not settle on the surface of any optical element, since that would result in particles being trapped between the surface and the coating which is being applied in the next step.

If it is desired, trace amount of water left on the surface of the optical element can be removed by a water miscible organic solvent after the hot air drying step. Low boiling point alcohols such as methanol or ethanol are commonly used.

In the dip-coating process of the present invention, optical elements are dip-coated with a given coating at predetermined dipping speed. The temperature of the coating solution is also controlled, along with the temperature and the humidity of the chamber in which the dipping process is carried out. The humidity control is especially important for a thermally curable coating based on the siloxane chemistry in which water is involved in the curing reactions.

The final coating thickness for the preferred embodiment ranges from 2 to 10 microns, and preferably from 4 to 6 microns in order to balance the coating properties such as tintability and abrasion resistance. The final coating thickness depends on many parameters. For a given coating solution, the coating thickness varies primarily with the withdrawing speed and the drying speed of the coated layer. The higher the withdrawing speed, the thicker the coated layer. In order to have a final coating layer thicker than 2 microns, a withdrawing speed of higher than 10 mm/s is usually needed for a thermally curable coating having a viscosity of around 10 cPs. The withdrawing speed is preferably between 10 mm/s and 80 mm/s, more preferably between 30 mm/s and 50 mm/s.

However, the coating solution coated on the optical element with a high withdraw speed will flow down toward the coating bath if the viscosity of the coated coating solution is not high enough to overcome the shear force exerted by the gravity. The end effect is a coating thickness gradually increasing from the top of the coated optical element to the bottom, to form a coating "wedge". More seriously, the coating solution may bead up near the bottom of the optical element. It is especially noticeable when the coating solution has very low viscosity (e.g. less than 10 cPs), and the coating process uses high withdrawal speed.

By holding the optical element such that it barely "touches" the surface of the coating solution for a predetermined time period after it is withdrawn from the solution, the aforementioned thickness problem is dramatically improved. For a 76 mm diameter lens dip-coated with a tintable coating, the dry coating thickness can be uniform enough that the darkness (visible light transmission) differential from the top to the bottom is less than 1.5% when the average darkness is around 20%. The same lens coated with the same coating without the holding period at the barely touch position gives a darkness differential above 2%.

Figure 1B:
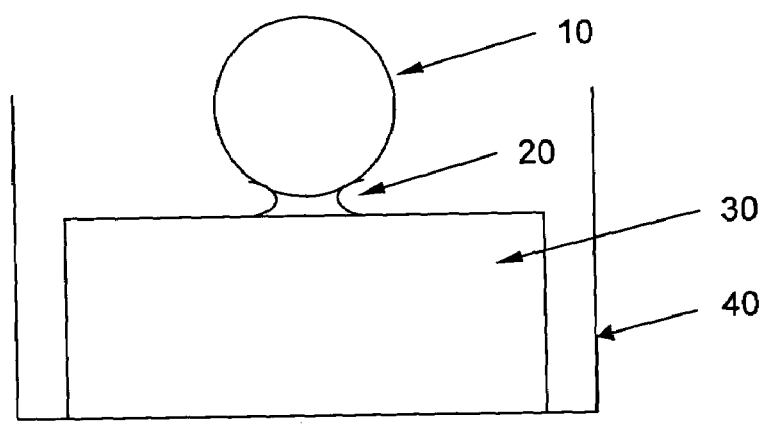
FIG. 1B is a side view of an optical element at holding position after dip coating.

The optical element holding step is next in the process. Referring to FIG. 1A, an optical element 10 is removed from the coating solution 30 in a coating bath 40. After removal, optical element 10 is held at the position that the bottom edge barely "touches" the surface of the coating solution. The holding time of the preferred embodiment may be from 10 seconds to 5 minutes, preferably from 10 seconds to 3 minutes, more preferably from 30 seconds to 120 seconds. In the preferred embodiment, the distance from the optical element 10 to the bath 40 is 2 mm, preferably less than 2 mm, more preferably less than 1 mm. As seen in FIG. 1B, a meniscus 20 forms between the optical element 10 and the coating solution 30. The distance from the coating solution to the bottom edge of the optical element is not limited as long as the meniscus holds. The shape and height of the meniscus 20 is determined by the coating properties such as surface tension and viscosity.

Next, the coated optical elements are moved into the drying area to dry them to a tack free state. The temperature of the drying area may range from 90° F. to 250° F., preferably 140° F. to 200° F. for 5 to 60 minutes, preferably 15 to 30 minutes. For a thermally curable coating, the curing starts in this step. Thus, it is also referred to as the precuring step.

According to the last step of the process of the present invention, the optical elements with the tack free coating layer are fully cured either on the line of the dip-coating process or off the line. For an UV curable coating, an UV source with proper spectral characteristic may be used to maximize the efficiency of the photoinitiator. It is preferred to fully cure an UV curable coating on line.

For a thermally curable coating, it is preferred to take the optical elements off the dip-coating line and transfer them into a convection oven to fully cure the coating. The cure of the coating is completed by heat curing at temperatures in the range of 150° F. to 400° F. for a period of from about 5 minutes to 18 hours. The dew point plays an important role for curing a siloxane based coating. Preferably, the dew point is between 40° F. to 80° F., more preferably between 50° F. to 60° F.

For optical elements, such as ophthalmic lenses, made from a thermoplastic resin such as polycarbonate, it is preferred to cure the coating at a temperature lower than the glass transition temperature of the resin. For polycarbonate lenses, the proper curing temperature is between about 200° F. and 300° F.

EXAMPLES

The process of the present invention will now be illustrated in more detail in reference to examples, which are for illustration purpose only and should not be construed as a limitation upon the scope of the invention in any way.

Tinting of Tintable Coating:

Optical elements with tintable hardcoat can be tinted with a black dye. The dye used in the test was Black BPI (BPI, Florida). One 3-oz tint bottle was used to make a quart of tint solution. The solution was heated to 200° F. to 210° F., and stirred for not less than 10 minutes before use. The solution should be stirred constantly with a stirring device such as a magnet stirring bar. Tinting process was performed on commercial available tinting bath such as BPI Stainless Steel Mini Tanks.

Optical elements were immersed vertical in the tint bath for 1 to 30 minutes until the shade reached the same shade of a control sample or a light transmittance of 15 to 20%.

Measuring Total Light Transmittance % (TLT %):

Light Transmittance is measured under the guideline of ASTM D 1003.

A unidirectional perpendicular light beam is directed onto the optical element, and a photo detector measures the total light transmitted by the sample after it enters an integrating sphere. Commercial haze meters are typically used for this testing, but ASTM D 1003 also allows for the use of a spectrophotometer, provided that it meets the procedure requirements.

Transmittance was measured using haze-guard plus hazemeters (Byk-Gadner, MD).

$$\text{Light Transmission}(\%) = \frac{\text{Total light transmitted by specimen}}{\text{Incident light}} \times 100$$

Visual Inspection of Tinted Optical Elements:

Optical elements are inspected by visual method after coating and after tinting with the aid of a light table. The optical elements are placed on the light table, and any imperfection such as streaks, changing in colors and shade are recorded.

Example 1

A thermally curable, tintable coating solution based on a polysiloxane was used to coat some polycarbonate lenses. The coating solution has solid level of 18 to 20% by weight and viscosity from 2.5 to 3.5 cPs. Coating solution was used with temperature from 40 to 50° F. A servomotor was used to control the dipping process. A dip speed of 51 mm/s to 64 mm/s was used. Relative vertical positions between lenses and coating solution were calculated for different lens diameter of 65, 72, 75 and 77 mm. The lenses were held for 1 minute at a position such that the bottoms of the lenses were within 1 mm of the coating solution. The lenses were then pre-cured at 180° F., and 20 minutes to a tack free state, and completely cured at 265° F. for 4 hours. There was no noticeable wedge at the bottom of the lens.

When tinted to 15 to 20% light transmittance with Black BPI dye (BPI, Florida), the lenses looked even in color, without streaks. Difference in transmittance from the top to the bottom of the tinted lenses was averaged at about 1.3%.

Comparative Example 1

A thermally-cured, tintable coating solution based on a polysiloxane was used to coat some polycarbonate lenses. The coating solution has a solid level of 18 to 20% and viscosity from 2.5 to 3.5 cPs. Coating solution was used with temperature from 40° F. to 50° F. The coating tank was moved up and down to dip the lenses. A dip speed of 51 mm/s to 6 mm/s was used. After the lenses came out of the coating solution, they were held for 2 seconds, then flipped by a robot so that the convex side of the lenses faced upward, and held for another 20 seconds until the dripping stopped. The lenses were then moved in that position into the oven to be pre-cured at 180° F. to a tack free state, and cured at 265° F. for 4 hours.

The resulting lenses had light wedges at the bottom were about 2 inches wide. Wedges of this type can be used to recognize lenses produced by the dip process on the market.

When tinted to 15 to 20% light transmittance with Black BPI dye, the lenses appeared lighter on the top and became darker at the bottom. The difference in transmittance from the top to the bottom of the tinted lenses averaged at 2 to 4%. The change in shade can be seen easily with visual inspection method, especially with the use of a light table.

Comparative Example 2

A thermally-cured, tintable coating solution based on a polysiloxane was used to coat some polycarbonate lenses. The coating solution has a solid level of 18 to 20% by weight and viscosity from 2.5 to 3.5 cP. The coating solution was used with a temperature from 40° F. to 50° F. The coating tank was moved up and down to dip the lenses. A dip speed of 51 mm/s to 64 mm/s was used. The lenses were moved by a robot. After the coating solution, the lenses were held for 30 seconds until the dripping stopped. The lenses were then moved in that position into the oven to be pre-cured at 180° F. to a tack free state, and later completely cured at 265° F. for 4 hours.

The resulting lenses had a thick wedge at the bottom of the lenses. The wedges had a light yellow color, and bubbles in some lenses. This type of wedge can be used to recognize lenses produced by the dip process on the market.

When tinted to 15 to 20% light transmittance with Black BPI dye, the lenses appeared lighter on the top and became darker at the bottom. Darker streaks were present. Difference in transmittance from the top to the bottom of the tinted lenses averaged at 3 to 5%. The change in shade can be seen easily with visual inspection method, even with the normal daylight.

It is understood that the preceding description is given merely by way of illustration and not in limitation of the invention and that various modifications may be made thereto without departing from the spirit of the invention as claimed.

What is claimed is:

1. A method of dip coating optical elements comprising: dipping an optical element into a coating solution bath; withdrawing the optical element from the coating solution bath; creating a meniscus between the optical element and the coating solution bath when the optical element is otherwise located above said coating solution bath; holding the optical element above the coating solution bath for at least 10 seconds while maintaining the meniscus so as to allow capillary forces to wick off a desired amount of the coating solution from the optical element.

2. The method of dip coating optical elements of claim 1 wherein the meniscus is created when the distance between the coating solution bath and the optical element is approximately 2 millimeters.

3. The method of dip coating optical elements of claim 1 wherein the viscosity of the coating solution is between 1 cPs and 20 cPs.

4. The method of dip coating optical elements of claim 1 wherein the temperature of the coating solution is between 30° Fahrenheit and 90° Fahrenheit.

5. The method of dip coating optical elements of claim 1 wherein the step of withdrawing the optical element from the coating solution proceeds at a speed between approximately 1.5 and 3 inches per second.

6. The method of dip coating optical elements of claim 1 further comprising curing the coating solution.

7. The method of dip coating optical elements of claim 1 further comprising washing the optical element prior to dipping.

8. A method of coating an eye element comprising: introducing the eye element into a coating solution; initiating a separation of the eye element from the coating solution; maintaining a touching of a bottom portion of the eye element with the coating solution for a predetermined period of time, no less than 10 seconds, sufficient to effect a wicking of excess solution from the element; and terminating the touching after the predetermined period.

9. The method of coating an eye lens of claim 8 wherein the touching of a bottom portion of the eye element with the coating solution creates a meniscus.

10. The method of coating an eye lens of claim 8 wherein the viscosity of the coating solution is between 1 cPs and 20 cPs.

11. The method of coating an eye lens of claim 8 further comprising curing the coating solution.

12. An eye lens comprising: a lens substrate; and a coating on the lens substrate, the coating having been applied with a dip coating method; and the lens substrate with the coating being free of a visually observable light wedge due to said coating solution being wicked from an edge of said lens substrate for at least 10 seconds, through a meniscus created between said coating solution and said edge of said lens substrate at the conclusion of said dip coating method.

13. The eye lens of claim 12 wherein the dip coating method comprises:
dipping an optical element into a coating;
withdrawing the optical element from the coating solution; and
creating a meniscus between the optical element and the coating solution so as to allow capillary forces to wick off a desired amount of the coating solution from the optical lens.

14. An eye lens comprising: a lens substrate;
a coating on the substrate, the coating having been applied by dip coating so as to allow such that capillary forces have wicked off a desired amount of said coating from the eve lens in a period of at least 10 seconds;
and, the lens substrate with the coating having a visible light transmission differential from a top to a bottom of the lens substrate of approximately 1.5%.

15. A method of dip coating optical elements comprising:
dipping an optical element into a coating solution bath so that the entire element is below a surface of the bath;
elevating the optical element above the surface of the bath except for the formation of a meniscus between said bath and said optical element;
holding the element above the surface of the bath while maintaining the meniscus for a predetermined period of time no less than 10 seconds so as to effect wicking of excess solution from the element to the bath through the meniscus;
removing the optical element from the bath thereby breaking the meniscus.

16. The method of claim 15 wherein elevating the optical element above the surface of the bath comprises raising the optical element above the surface of the bath.

17. The method of claim 15 wherein elevating the optical element above the surface of the bath comprises lowering the bath below the optical element.

18. The method of claim 15 wherein elevating the optical element above the surface of the bath comprises draining the bath, thereby lowering the surface of the bath.

* * * * *